United States Patent [19]
Citterbart et al.

[11] Patent Number: 6,001,769
[45] Date of Patent: Dec. 14, 1999

[54] COMPOSITIONS AND METHODS FOR THE REMEDIATION OF CHEMICAL CONTAMINATION IN SUBSURFACE WATER BEARING GEOLOGICAL FORMATIONS

[75] Inventors: John Michael Citterbart, Parsippany; Sam Kumar, Lincroft, both of N.J.

[73] Assignee: Correctivaction, LLC, Lincroft, N.J.

[21] Appl. No.: 08/937,938

[22] Filed: Sep. 25, 1997

[51] Int. Cl.$^6$ .................................................. B01J 20/02
[52] U.S. Cl. ...................... 502/437; 502/400; 502/401; 502/416; 502/417; 502/512
[58] Field of Search .................................. 502/400, 401, 502/416, 417, 437, 512; 210/691

[56] References Cited

U.S. PATENT DOCUMENTS

| | | | |
|---|---|---|---|
| 3,872,002 | 3/1975 | Musgrove | 210/39 |
| 3,892,661 | 7/1975 | Siviour | 210/694 |
| 4,081,403 | 3/1978 | Takegami et al. | 252/428 |
| 4,084,382 | 4/1978 | Clem | 405/264 |
| 4,167,973 | 9/1979 | Forte et al. | 166/267 |
| 4,591,443 | 5/1986 | Brown et al. | 210/747 |
| 4,699,660 | 10/1987 | Frank et al. | 106/31 |
| 4,778,602 | 10/1988 | Allen, III | 210/679 |
| 5,254,521 | 10/1993 | Knudson | 502/432 |
| 5,286,141 | 2/1994 | Vigneri | 405/128 |
| 5,378,280 | 1/1995 | Cruze | 106/793 |
| 5,443,158 | 8/1995 | McKenny et al. | 209/166 |
| 5,501,977 | 3/1996 | Cruze | 435/266 |

OTHER PUBLICATIONS

Hawley's Condensed Chemical Dictionary, Eleventh Edition, p. 695, 1987.

Grant & Hackh's Chemical Dictionary, p. 271, 1988.

Gaffney J.S. et al., Humic and Fulvic Acids and Organic Colloidal Materials in the Environment, Humic and Fulvic Acids, Gaffrey J.S. et al., (eds), ACS Symposium Series 651, 1:2–16 (1996).

Ivanovich M. et al., Isotopic Characterization of Humic Colloids and Other Organic and Inorganic Dissolved Species in Selected Groundwaters from Sand Aquifers at Gorleben, Germany, Humic and Fulvic Acids, Gaffrey J.S. et al., (eds), ACS Symposium Series 651, 14:220–243 (1996).

Moulin V.M. et al., Role of Humic Substances and Colloids in the Behavior of Radiotoxic Elements in Relation to Nuclear Waste Disposal, Humic and Fulvic Acids, Gaffrey J.S. et al., (eds), ACS Symposium Series 651, 16:257–271 (1996).

Patterson H.H. et al., Enhancement of the Water Solubility of Organic Pollutants Such as Pyrene by Dissolved Organic Matter, Humic and Fulvic Acids, Gaffrey J.S., et al., (eds), ACS Symposium Series 651, 18:288–298 (1996).

*Primary Examiner*—John F. Niebling
*Assistant Examiner*—Alexander G. Ghyka

[57] ABSTRACT

Compositions and methods for decreasing chemical contamination in subsurface water bearing geological formations, comprising an oxidized form of lignitic coal, or its derivatives, preferably leonardite, and at least one surface active agent. The compositions can be applied to an affected water bearing formation by conventional groundwater management methods, e.g., injection wells and groundwater extraction systems.

84 Claims, No Drawings

COMPOSITIONS AND METHODS FOR THE REMEDIATION OF CHEMICAL CONTAMINATION IN SUBSURFACE WATER BEARING GEOLOGICAL FORMATIONS

FIELD OF THE INVENTION

The present invention relates to the remediation of groundwater, e.g., water in subsurface geological formations.

BACKGROUND OF THE INVENTION

The remediation of groundwater contamination is one of the most costly aspects of environmental remediation—consuming revenues from the parties responsible for the release of chemical contamination and insurance companies providing coverage for environmental remediation. As a result, the price of consumer goods and insurance premiums often rise to offset disbursements for costly environmental remediation, and tax dollars are often consumed to employ governmental regulatory agencies to oversee remediation or take on the responsibility of remediation in the event the responsible party is bankrupt or nonexistent or otherwise unable or willing to meet its financial obligations.

When chemical contamination is released into subsurface water bearing geological formations, groundwater supplies are affected and, are often, rendered nonpotable. Groundwater is one of the world's greatest natural resources supplying water for vegetation, animals and humans, especially in areas where there is little or no surface precipitation. Groundwater exists in a variety of geological formations, such as perched water in the unsaturated zone, the water table in the saturated zone, shallow and deep aquifers and bedrock aquifers, all of which in some capacity recharge contiguous subsurface water bearing formations or surface water bodies, such as lakes, ponds, swamps, marshes, bogs, rivers, streams, brooks and springs, etc. Groundwater and surface water bodies may be used as sources for drinking, recreation or irrigation. Consequently, chemical contamination released into subsurface water bearing geological formations must be remediated to safeguard the environment, animals and humans.

The remediation process will vary depending on the type, location, and amount of the chemical contamination. For example, if chemical contamination in subsurface water bearing geological formations readily dissolves or disperses into the groundwater, then many conventional remediation methods might be effective in treating chemical contamination in subsurface water bearing geological formations. However, hydrophobic or water insoluble chemical contamination released into subsurface water bearing geological formations has an affinity to bind by adsorption, adhesion or other physical phenomenon to the surface area within the primary porosity or secondary porosity of an affected water bearing formation as the chemical contamination is physically carried by groundwater. The chemical contamination bound to the subsurface water bearing geological formation slowly dissolves into the groundwater that flows through the area of contamination rendering the water supply nonpotable for years, if not permanently, depending on the extent of the chemical contamination. Chemical contamination bound to the subsurface water bearing geological formation is extremely difficult to remediate by conventional remediation methods, such as groundwater extraction, induced biodegradation, high temperature processes and oxidation processes (e.g., ozonolysis, hydrogen peroxide, uv treatment, radiation, etc.). Conventional remediation methods have numerous shortcomings which limit their ability to remediate chemical contamination quickly and efficiently.

For purposes of this invention "chemical contaminant" or "chemical contamination" means a chemical substance which can be classified in at least one of the following categories: volatile organic compounds; semi-volatile organic compounds; acid extractable compounds; phenolic compounds; base neutral compounds; polycyclic aromatic hydrocarbons; polychlorinated biphenyls; pesticides; insecticides; herbicides; metals; and radionuclides.

For purposes of this invention "free chemical contamination" is defined as chemical contamination of hydrophobic or water insoluble character which is floating or undissolved in the body of groundwater contained within the affected water bearing formation and not bound to the surface area within the primary porosity or secondary porosity of the affected water bearing formation.

For purposes of this invention, "primary porosity" as used in this application means the void space in granular unconsolidated rock formations or granular consolidated rock formations, and "secondary porosity" as used in this application means the fractures in consolidated rock formations.

For purposes of this invention "oxidized form of lignitic coal" as used in this application means leonardite, other oxidized forms of lignitic coal, purified humic acid component of leonardite or other oxidized forms of lignitic coal, and chemically altered humic acid component of the oxidized forms of lignitic coal from processes such as biological degradation or chemical processes such as hydrolysis, esterification, transesterification, condensation, amidation, alkylation or salt formation with elements of nature or other suitable derivatives.

For purposes of this invention an "eluting component" as used in this application means the oxidized form of lignitic coal or the surface active agent in a composition which forms a water soluble complex with the chemical contamination by adsorption, adhesion, chelation or other physical phenomenon, such as covalent binding, coordinate binding or complexation.

For purposes of this invention "electronegativity" as used in this application means the positive or negative attractive force exerted by the chemical contaminant which defines its character regarding adsorption, adhesion, chelation or other physical phenomenon, such as covalent binding or complexation.

For purposes of this invention "eluant plume" is defined as the volumetric or areal extent of groundwater in the affected water bearing formation containing the dissolved complex formed between the chemical contamination and a composition of the present invention.

For purposes of this invention "in concentrations sufficient to complex with a chemical contaminant" or "in a concentration sufficient to complex with a chemical contaminant" means the suitable amount of an eluting component in a composition which effectively forms a complex with a chemical contaminant in a subsurface water bearing geological formation.

OBJECTIVES AND SUMMARY OF THE INVENTION

The present invention provides compositions comprised of an oxidized form of lignitic coal, preferably leonardite, and at least one surface active agent for decreasing chemical contamination bound to the subsurface water bearing geological formation. The compositions can be applied to an affected water bearing formation by conventional methods, e.g., injection wells. The present invention does not require altering the molecular structure of the chemical contamination. Rather, the present invention elutes the chemical contamination from the subsurface water bearing geological formation by forming a water soluble complex with the chemical contamination. The groundwater containing the dissolved complex formed between the bound chemical contamination and the composition of the present invention can be removed from the treated water bearing formation by conventional methods, e.g., pumping wells or other groundwater withdrawal, filtering or purification systems.

In an especially preferred embodiment of the invention, the compositions have an oxidized form of lignitic coal component and a surface active agent component. The oxidized form of lignitic coal component of the present invention has a greater capacity than the affected water bearing formation to bind with the chemical contamination, and thus, forms a water soluble complex with the chemical contamination by adsorption, adhesion, chelation or other physical phenomenon, such as covalent binding or complexation. The surface active agent component of the present invention possibly acts as a crown ether capable of enhancing the solubility of both the oxidized form of lignitic coal component and the oxidized form of lignitic coal component-chemical contaminant complex. The surface active agents of high molecular weight are more prone to this mode of action than surface active agents of low molecular weight. The surface active agent component appears to block the superfluous active sites of the oxidized form of lignitic coal component that hinder the binding sites which complex with the chemical contamination. It has been observed that the oxidized form of lignitic coal component elutes the chemical contamination in the absence of a surface active agent, but the activity of the oxidized form of lignitic coal component is accelerated by the presence of the surface active agent component, and hence, the rate of the process is enhanced by the presence of a suitable surface active agent component. The characteristics of the chemically contaminated subsurface water bearing formation (e.g., chemical contamination, hydrogeology, and lithology) dictate the surface active agent component, or combinations thereof, utilized in the compositions of the present invention.

It is an object of this invention to provide a composition comprised of an oxidized form of lignitic coal and a cationic surface active agent in concentrations sufficient to complex with a chemical contaminant in a subsurface water bearing geological formation, wherein the composition has a pH range of about pH 4 to about pH 7.

It is another object of this invention to provide a composition comprised of an oxidized form of lignitic coal and an anionic surface active agent in concentrations sufficient to complex with a chemical contaminant in a subsurface water bearing geological formation, wherein the composition has a pH range of at about pH 7 to about pH 10.

It is still another object of this invention to provide a composition comprised of an oxidized form of lignitic coal and an amphoteric surface active agent from synthetic or naturally occurring sources in concentrations sufficient to complex with a chemical contaminant in a subsurface water bearing geological formation, wherein the composition has a pH range of about pH 4 to about pH 10.

It is yet another object of this invention to provide a composition comprised of an oxidized form of lignitic coal and a nonionic surface active agent from synthetic or naturally occurring sources in concentrations sufficient to complex with a chemical contaminant in a subsurface water bearing geological formation, wherein the composition has a pH range of about pH 4 to about pH 10.

It is a further object of this invention to provide a composition comprised of an oxidized form of lignitic coal, at least one cationic surface active agent and at least one amphoteric surface active agent in concentrations sufficient to complex with a chemical contaminant in a subsurface water bearing geological formation, wherein the composition has a pH range of about pH 4 to about pH 7.

It is still a further object of this invention to provide a composition comprised of an oxidized form of lignitic coal, at least one cationic surface active agent and at least one nonionic surface active agent in concentrations sufficient to complex with a chemical contaminant in a subsurface water bearing geological formation, wherein the composition has a pH range of about pH 4 to about pH 7.

It is yet another object of this invention to provide a composition comprised of an oxidized form of lignitic coal, at least one cationic surface active agent, at least one amphoteric surface active agent and at least one nonionic surface active agent in concentrations sufficient to complex with a chemical contaminant in a subsurface water bearing geological formation, wherein the composition has a pH range of about pH 4 to about pH 7.

A further object of this invention is to provide a composition comprised of an oxidized form of lignitic coal, at least one anionic surface active agent and at least one amphoteric surface active agent in concentrations sufficient to complex with a chemical contaminant in a subsurface water bearing geological formation, wherein the composition has a pH range of about pH 7 to about pH 10.

Yet another object of this invention is to provide a composition comprised of an oxidized form of lignitic coal, at least one anionic surface active agent and at least one nonionic surface active agent in concentrations sufficient to complex with a chemical contaminant in a subsurface water bearing geological formation, wherein the composition has a pH range of about pH 7 to about pH 10.

Yet another object of this invention is to provide a composition comprised of an oxidized form of lignitic coal, at least one anionic surface active agent, at least one amphoteric surface active agent and at least one nonionic surface active agent in concentrations sufficient to complex with a chemical contaminant in a subsurface water bearing geological formation, wherein the composition has a pH range of about pH 7 to about pH 10.

Yet another object of this invention is to provide a composition comprised of an oxidized form of lignitic coal, at least one amphoteric surface active agent and at least one nonionic surface active agent in concentrations sufficient to complex with a chemical contaminant in a subsurface water bearing geological formation, wherein the composition has a pH range of about pH 4 to about pH 10.

It is still a further object of this invention to provide a method for preparing a composition for decreasing chemical contamination in subsurface water bearing geological formations, comprising the steps of: combining an oxidized form of lignitic coal, and at least one surface active agent in concentrations sufficient to complex with a chemical contaminant in a subsurface water bearing geological formation, wherein the concentration of the oxidized form of lignitic coal component ranges from about 1% to about 40% (by weight of the total composition), preferably about 10% to about 25% (by weight of the total composition), the concentration of surface active agent component ranges from about 0.5% to about 20% (by weight of the total composition), preferably about 5% to about 15% (by weight of the total composition), and the balance of the composition is water, wherein the method is carried out at about pH 4 to about pH 10.

It is still a further object of this invention to provide a method for preparing a composition for decreasing chemical contamination in subsurface water bearing geological formations, comprising the steps of: combining an oxidized form of lignitic coal and multiple surface active agents, wherein each surface active agent component is preferably added in an amount so that the total weight percent of all of the surface active agent components ranges from about 0.5% to about 20% (by weight of the total composition) and preferably about 5% to about 15% (by weight of the total composition), wherein the method is carried out at about pH 4 to about pH 10.

It is yet another object of this invention to provide a method for preparing a composition for decreasing chemical contamination in subsurface water bearing geological formations, comprising the steps of:

(a) pretreating the oxidized form of lignitic coal having soluble eluting materials and insoluble inert substances in a caustic solution at a pH greater than 10.0 at ambient temperature for about 24 to about 48 hours to dissolve the eluting materials;

(b) optionally adjusting the viscosity of the solution using a hydroxylic solvent with the general formula R—OH, where $R=C_nH_{(2n+1)}$, where n=0 to 10, preferably n=0 to 2, and most preferably n=0;

(c) removing the insoluble inert substances from the solution;

(d) optionally adjusting the concentration of the oxidized form of lignitic coal in the solution by dilution using a hydroxylic solvent with the general formula R—OH, where $R=C_nH_{(2n+1)}$, where n=0 to 10, preferably n=0 to 2, and most preferably n=0;

(e) optionally adjusting the pH of the solution from about pH 4 to about pH 10 using an inorganic acid, organic acid or reducing agent, wherein the reducing agent is a monovalent sulfite compound (e.g., sodium bisulfite or potassium bisulfite) or bivalent sulfite compound (e.g., magnesium sulfite or calcium sulfite), preferably a monovalent sulfite compound;

(f) adding at least one surface active agent in a concentration sufficient to complex with a chemical contaminant in a subsurface water bearing geological formation. Optionally, a step (g) may be added, further comprising the step of adding a hydroxylic solvent with the general formula R—OH, where $R=C_nH_{(2n+1)}$, where n=1 to 10, preferably n=1 to 2, and most preferably n=2, in an amount sufficient to solubilize the surface active agent utilized.

Yet another object of this invention is to provide a composition comprised of an oxidized form of lignitic coal in a concentration sufficient to complex with a chemical contaminant in a subsurface water bearing geological formation, wherein the composition has a pH range of about pH 4 to about pH 10.

It is still another object of this invention to provide a method for preparing a composition for decreasing chemical contamination in subsurface water bearing geological formations, comprising the steps of: combining an oxidized form of lignitic coal in a concentration sufficient to complex with a chemical contaminant in a subsurface water bearing geological formation, wherein the concentration of the oxidized form of lignitic coal component ranges from about 1% to about 40% (by weight of the total composition), preferably about 10% to about 25% (by weight of the total composition), and the balance of the composition is water, wherein the method is carried out at about pH 4 to about pH 10.

It is a further object of this invention to provide a method for preparing compositions for decreasing chemical contamination in subsurface water bearing geological formations, comprising the steps of:

(a) pretreating the oxidized form of lignitic coal having soluble eluting materials and insoluble inert substances in a caustic solution at a pH greater than 10.0 at ambient temperature for about 24 to about 48 hours to dissolve the eluting materials;

(b) optionally adjusting the viscosity of the solution using a hydroxylic solvent with the general formula R—OH, where $R=C_nH_{(2n+1)}$, where n=0 to 10, preferably n=0 to 2, and most preferably n=0;

(c) removing the insoluble inert substances from the solution;

(d) optionally adjusting the concentration of the oxidized form of lignitic coal in the solution by dilution using a hydroxylic solvent with the general formula R—OH, where $R=C_nH_{(2n+1)}$, where n=0 to 10, preferably n=0 to 2, and most preferably n=0; and (e) optionally adjusting the pH of the solution from about pH 4 to about pH 10 using an inorganic acid, organic acid or reducing agent, wherein the reducing agent is a monovalent sulfite compound (e.g., sodium bisulfite or potassium bisulfite) or bivalent sulfite compound (e.g., magnesium sulfite or calcium sulfite), preferably a monovalent sulfite compound.

It is still another object of this invention to provide a composition, wherein the preferred oxidized form of lignitic coal is leonardite.

It is still another object of this invention to provide a composition, wherein the oxidized form of lignitic coal is a water soluble derivative altered by chemical or biological means.

It is still another object of this invention to provide a composition, wherein the preferred cationic surface active agent is a cationic surfactant.

It is still another object of this invention to provide a composition, wherein the preferred anionic surface active agent is an anionic surfactant.

It is still another object of this invention to provide a composition, wherein the preferred amphoteric surface active agent is an amphoteric surfactant.

It is still another object of this invention to provide a composition, wherein the preferred nonionic surface active agent is a nonionic surfactant.

Yet another object of this invention is to provide a method of decreasing chemical contamination in subsurface water bearing formations having primary and secondary porosities, comprising the steps of:

(a) applying a composition into an affected subsurface water bearing geological formation to form a dissolved complex with the chemical contamination bound to the surface areas of the primary and secondary porosities of the subsurface water bearing geological formation;

(b) monitoring the conditions in an affected subsurface water bearing geological formation;

(c) continuing the application of a composition until the chemical contamination has decreased to an acceptable level;

(d) removing from the treated subsurface water bearing geological formation the groundwater containing a dissolved complex formed between the chemical contamination and a composition; and (e) washing excess composition from the treated subsurface water bearing geological formation.

The method may further comprise the step of adjusting at least one of the following: concentration of the oxidized form of lignitic coal in a composition; concentration and type of the surface active agent in a composition; and pH of a composition in response to the monitored conditions of an area of contamination within a subsurface water bearing geological formation.

Another object of the present invention is to decrease the free chemical contamination in a body of groundwater contained within the subsurface water bearing geological formation having primary and secondary porosities, comprising the steps of:

(a) applying a composition into the affected body of groundwater within a subsurface water bearing geological formation to form a dissolved complex with the free chemical contamination not bound to the surface areas of the primary and secondary porosities of the subsurface water bearing geological formation;

(b) monitoring the conditions in an affected body of groundwater contained within the subsurface water bearing geological formation;

(c) continuing the application of a composition until the free chemical contamination has decreased to an acceptable level;

(d) removing from the treated body of groundwater contained within the subsurface water bearing geological formation the groundwater containing a dissolved complex formed between the free chemical contamination and a composition; and (e) washing excess composition from the treated body of groundwater contained within the subsurface water bearing geological formation.

The method may further comprise the step of adjusting at least one of the following: concentration of the oxidized form of lignitic coal in a composition; and pH of a composition in response to the monitored conditions of an area of contamination within a subsurface water bearing geological formation.

Still another object of the present invention is to decrease the hemical contamination in the removed groundwater containing the dissolved complex formed between the bound or free chemical contamination and a composition of the present invention to an acceptable level prior to disposal or discharge by conventional filtration or purification methods known to those skilled in the art, e.g., activated carbon treatment, reverse osmosis, ultrafiltration, aeration, oxidation processes or biodegradation.

DETAILED DESCRIPTION OF THE PREFERRED EMBODIMENTS OF THE INVENTION

The development of a faster, cheaper and more efficient composition and method to remediate chemical contamination in subsurface water bearing geological formations is extremely desirable. The present invention reduces the time and expense to remediate chemical contamination in subsurface water bearing geological formations. Further, the present invention reduces the need for expensive, long term monitoring of chemically contaminated groundwater often required subsequent to the implementation of conventional remediation methods because of their shortcomings in remediating chemical contamination. Further, the components of the compositions of the present invention are water soluble, biodegradable and nontoxic to humans, animals and the environment.

The present invention relates to novel aqueous compositions, comprised of an oxidized form of lignitic coal, preferably leonardite, and at least one biodegradable synthetic anionic, cationic, amphoteric or nonionic surfactant, or naturally occurring surface active agent, or a combination thereof, that are stable at both acidic and basic pH conditions, and that have broad applications in the remediation of chemical contaminants released into subsurface water bearing geological formations. The present invention has been shown effective in remediating chemical contaminants which can be characterized in at least one of the following categories: volatile organic compounds; semi-volatile organic compounds; acid extractable compounds; phenolic compounds; base neutral compounds; polycyclic aromatic hydrocarbons; polychlorinated biphenyls; pesticides; insecticides; herbicides; and metals. The present invention can also be utilized to remediate radionuclides because the properties of radionuclides are akin to heavy metals and the compositions of the present invention will not distinguish between radionuclides and heavy metals.

Leonardite is a soft, earthy brown colored, naturally oxidized lignitic coal material occurring abundantly in many parts of the world including the United States, e.g., North Dakota, Texas and parts of Florida. It is generally found above grade in a lignitic outcropping or below grade in the overburden at depths not exceeding about twenty feet. Depending on the source, leonardite contains humic acid at about 50% to about 80% (by weight) and inert substances such as clay, silicates of magnesium, aluminum, alkaline earth salts and metallic oxides. Conventional methods of isolating humic acid from bituminous coal sources involve dissolving the bituminous coal sources in a caustic solution at pH greater than about 10 and maintaining the solution at a temperature over about 30° C. for about 6 to about 8 hours. Leonardite is quite stable in alkaline solution but it precipitates or gels at about neutral and acidic pH. Several conventional processes involve treating leonardite with an oxidizing agent under acidic conditions to obtain a solution; however, these solutions prove to be unstable and eventually solidify. The present invention utililizes a reducing agent to produce novel preparations of aqueous compositions containing leonardite which are stable under acidic conditions. Preferred reducing agents are monovalent sulfite compounds (e.g., sodium bisulfite or potassium bisulfite) or bivalent sulfite compounds (e.g., magnesium sulfite or calcium sulfite). The most preferred reducing agents are monovalent sulfite compounds.

In the present invention, leonardite particles are pretreated in a caustic solution at ambient temperature for about 24 to about 48 hours to dissolve the eluting materials. In a preferred embodiment, the pH is maintained at greater than about 10.0 during this step. The insoluble inert substances are then removed from the leonardite solution by conventional methods, e.g., filtration or centrifugation. Optionally, the viscosity of the leonardite solution may be adjusted prior to the removal of the insoluble inert substances using a hydroxylic solvent, such as water, ethanol, methanol, etc., with the general formula R—OH, where $R=C_nH_{(2n+1)}$, where n=0 to 10, preferably n=0 to 2, and most preferably n=0. Depending on the application, the concentration of leonardite in the solution may be adjusted by dilution using additional hydroxylic solvent and the pH of the solution may be adjusted from about pH 4 to about pH 10 using an inorganic acid, organic acid or reducing agent. At least one surface active agent is added to attain a composition of the present invention, preferably after any dilution or pH adjustment is carried out. Depending on the physical properties of the surface active agent utilized, a hydroxylic solvent, such as ethanol, methanol, etc., with the general formula R—OH, where $R=C_nH_{(2n+1)}$, where n=1 to 10, preferably n=1 to 2, and most preferably n=2, may optionally be added in an amount sufficient to solubilize the surface active agent.

The humic acid component of the oxidized forms of lignitic coal may be chemically altered to modify and enhance its water solubility. The use of a surface active agent component in the compositions may optionally be used for enhancing the solubility of the oxidized form of lignitic coal. However, the use of at least one surface active agent in the compositions comprised of a water soluble-enhanced oxidized form of lignitic coal is the most preferred method. A suitable surface active agent can be cationic, anionic, amphoteric or nonionic having alkyl chains of 2 to 25 carbon atoms, and preferably 4 to 20 carbon atoms. The most preferred surface active agents are nonionic surfactants.

The group of anionic surface active agents includes, but is not limited to, surfactants prepared from condensation products of formalin with sulfonic acid or salts of sulfonic acid of cyclic aromatic compounds such as naphthalene, alkylnaphthalene, alkylphenol or alkylbenzene in which the degree of condensation of formalin is 2 to 25 and preferably 5–20. Preferred salts are lower amines such as ammonium, monoethanolamine, diethanolamine, triethanolamine and triethylamine or alkali metals or alkaline earth metals such as potassium, sodium, magnesium and calcium. Preferred alcohols in the sulfuric ester salts having 4 to 16 carbon atoms in which the salts are lower amines, such as ammonium, monoethanolamine, diethanolamine, triethanolamine, or alkali metals (e.g., sodium or potassium) or alkaline earth metals (e.g., magnesium or calcium) as in sodiumdodecyl sulfate, sodiumlauryl sulfate or sodiumoctyl sulfate. This group also includes, but is not limited to, surfactants prepared from formalin condensation products of lignin sulfonic acid, lignin sulfonates or sulfonates of aromatic compounds, such as naphthalene, alkyl naphthalene and their salts.

The group of cationic surface active agents includes, but is not limited to, surfactants of quaternary salts of nitrogen substituted with alkyl chains of 2 to 20 carbon atoms, including tetra alkyl ammonium halides.

The group of amphoteric surface active agents includes, but is not limited to, surfactant molecules containing both an acidic and basic group substituted with ether or hydroxyl groups to enhance hydrophilicity. This group also includes, but is not limited to, naturally occurring amphoteric surfactants originating from plants such as phosphotidyl choline compounds, preferably lecithin.

The group of nonionic surface active agents includes, but is not limited to, surfactants prepared from alkylene oxide addition products of compounds having phenolic hydroxyl groups such as phenol, cresol, nonylphenol, dinonylphenol and dodecylphenol in which the alkylene oxide is ethylene oxide and/or propylene oxide. This group also includes, but is not limited to, surfactants prepared from alkylene oxide addition products of the formalin condensation products of compounds having phenolic hydroxyl groups such as alkyl phenol, benzylated phenol in which a condensation degree is 2 to 25 and preferably 4 to 20. The alkylene oxide is preferably ethylene oxide and/or propylene oxide. Further, this group includes, but is not limited to, surfactants prepared from alkylene oxide addition products of polyvalent alcohols such as glycerol, trimethylolpropane, pentaerythritol, sorbitol, sucrose, ethylene glycol, polyethylene glycol, polypropylene glycol or the esters of these polyalcohols and fatty acids having 8 to 20 carbon atoms. This group also includes, but is not limited to, naturally occurring nonionic surface active agents originating from microorganisms (e.g., xanthan gum, bluran and dextran), plants (e.g., agar, galaginan, phaseleran, alginates and their salts, locust bean gum, guar gum, fatsia gum, gum arabica, karaya gum, tragacanth, pectin and processed starch) and animals (e.g., gelatin and casein).

The concentrations of the oxidized form of lignitic coal, and surface active agent components in the present invention depend on certain conditions, such as the types, concentrations, electronegativities and molecular sizes of the chemical contaminants, the volume of chemical contamination, and the hydrogeology (e.g., dilution effect of groundwater, groundwater chemistry, etc.) and lithology (e.g., porosity, hydraulic conductivity, etc.) of the subsurface water bearing geological formation. To determine these conditions, the chemical contamination in a subsurface water bearing geological formation should be delineated and characterized and the lithology and hydrogeology of the water bearing formation defined using conventional sampling and analysis methods. Based on the types and electronegativities of chemical contamination detected in the sampling and analysis, at least one composition comprised of an oxidized form of lignitic coal, preferably leonardite, and at least one surface active agent is prepared in accordance with the specifications in Table 1. The compositions can be applied to an affected water bearing formation by conventional methods, e.g., injection wells. In the event the chemical contamination contains two or more types of chemical contaminants, a composition comprised of an oxidized form of lignitic coal and two or more surface active agents, or a multiple phase application of two or more compositions may be utlilized. During a multiple phase application involving incompatible cationic and anionic compositions, it is preferred that the treatment with one composition should be completed prior to the application of the second composition.

Table 1 summarizes preferred combinations of eluting components in the compositions of the present invention based on the types and electronegativities of the chemical contaminants.

TABLE 1

CHEMICAL CONTAMINANTS AND CORRESPONDING ELUTING COMPONENTS
OF THE PREFERRED COMPOSITIONS OF THE PRESENT INVENTION

| Chemical Contaminants | | Combinations of Eluting Components |
|---|---|---|
| Type of Chemical Contaminant | Electronegativity | (Leonardite Is the Preferred Oxidized Form of Lignitic Coal in All Cases) |
| Volatile Organic Compounds | All Species (e.g., positive charge | Leonardite and Nonionic Surfactant(s) |
| | negative charge, weak positive or weak negative charge, and no charge) | Leonardite and Nonionic Surface Active Agent(s) |
| | Weak Positive or Weak Negative Charge | Leonardite and Amphoteric Surfactant(s) |
| Semi-volitile Organic Compounds | All Species (e.g., positive charge, | Leonardite and Nonionic Surfactant(s) |
| | negative charge, weak positive or weak negative charge, and no charge) | Leonardite and Nonionic Surface Active Agent(s) |
| | Positive Charge | Leonardite and Anionic Surfactant(s) |

TABLE 1-continued

CHEMICAL CONTAMINANTS AND CORRESPONDING ELUTING COMPONENTS
OF THE PREFERRED COMPOSITIONS OF THE PRESENT INVENTION

| Chemical Contaminants | | Combinations of Eluting Components |
|---|---|---|
| Type of Chemical Contaminant | Electronegativity | (Leonardite Is the Preferred Oxidized Form of Lignitic Coal in All Cases) |
| | Negative Charge | Leonardite and Cationic Surfactant(s) |
| | Weak Positive or Weak Negative Charge | Leonardite and Amphoteric Surfactant(s) |
| Acid Extractable Compounds | Negative Charge | Leonardite and Nonionic Surfactant(s) |
| | | Leonardite and Nonionic Surface Active Agent(s) |
| | | Leonardite and Cationic Surfactant(s) |
| Phenolic Compounds | Negative Charge | Leonardite and Nonionic Surfactant(s) |
| | | Leonardite and Nonionic Surface Active Agent(s) |
| | | Leonardite and Cationic Surfactant(s) |
| Base Neutral Compounds | All Species (e.g., positive charge, negative charge, weak positive or weak negative charge, and no charge) | Leonardite and Nonionic Surfactant(s) Leonardite and Nonionic Surface Active Agent(s) |
| | Positive Charge | Leonardite and Anionic Surfactant(s) |
| | Negative Charge | Leonardite and Cationic Surfactant(s) |
| | Weak Positive or Weak Negative Charge | Leonardite and Amphoteric Surfactant(s) |
| Polycyclic Aromatic Hydrocarbons | All Species (e.g., positive charge, negative charge, weak positive or weak negative charge, and no charge) | Leonardite and Nonionic Surfactant(s) Leonardite and Nonionic Surface Active Agent(s) |
| | Positive Charge | Leonardite and Anionic Surfactant(s) |
| | Negative Charge | Leonardite and Cationic Surfactant(s) |
| | Weak Positive or Weak Negative Charge | Leonardite and Amphoteric Surfactant(s) |
| Pesticides/Insecticides/ Herbicides | All Species (e.g., positive charge, negative charge, weak positive or weak negative charge, and no charge) | Leonardite and Nonionic Surfactant(s) Leonardite and Nonionic Surface Active Agent(s) |
| | Weak Positive or Weak Negative Charge | Leonardite and Amphoteric Surfactant(s) |
| Polychlorinated Biphenyls | No Charge | Leonardite and Nonionic Surfactant(s) Leonardite and Nonionic Surface Active Agent(s) |
| Metals | Positive Charge | Leonardite and Nonionic Surfactant(s) Leonardite and Nonionic Surface Active Agent(s) |
| Radionuclides | Positive Charge | Leonardite and Nonionic Surfactant(s) Leonardite and Nonionic Surface Active Agent(s) |

The eluting components of the compositions of the present invention should be present in concentrations sufficient to complex with the chemical contaminants sought to be removed. In a preferred embodiment of the invention, the concentration of the oxidized form of lignitic coal ranges from about 1% to about 40% (by weight of the total composition), preferably about 10% to about 25% (by weight of the total composition), the concentration of the surface active agent ranges from about 0.5% to about 20% (by weight of the total composition), preferably about 5% to about 15% (by weight of the total composition), and the balance of the composition is water. In compositions utilizing an oxidized form of lignitic coal and multiple surface active agents, each surface active agent is preferably added in an amount so that the total weight percent of all of the surface active agents ranges from about 0.5% to about 20% (by weight of the total composition) and preferably about 5% to about 15% (by weight of the total composition), depending upon the chemical contamination.

The concentrations of the eluting components of the compositions can depend on factors such as the concentrations, strengths of electronegativities and molecular sizes of the chemical contaminants, the volume of chemical contamination, and the hydrogeology and lithology of the subsurface water bearing geological formation. For instance, chemical contamination exerting strong binding forces to the affected geological formation may require a composition with a greater concentration of eluting components than chemical contamination exerting weak binding forces, even though the concentrations of the strong and weak binding chemical contaminants may be similar. Likewise, chemical contamination of large molecular size may require a composition with a greater concentration of eluting components than chemical contamination of small molecular size, even though the concentrations of the large and small sized chemical contaminants may be similar. Further, chemical contamination in an affected water bearing formation containing hard groundwater may require an initial composition with higher concentrations of eluting components to compensate for the effect of the minerals causing hardness (e.g., calcium, magnesium, etc.), whereas this overcompensation may be adjusted by decreasing the concentrations of eluting components of the composition as the groundwater chemistry is impacted by a composition of the present invention. Furthermore, a porous sandy geological formation may accommodate a denser composition containing a higher concentration of eluting components for faster remediation of the chemical contamination, whereas a clayey geological formation with tortuous pore space may require a dilute composition relative to the amount of chemical contamination to facilitate an eluant plume of low density.

The conditions of the affected water bearing formation should be considered in determining the initial composition for achieving the highest level of effectiveness of the present invention and should be monitored in the field using appropriate sampling and analysis methods well known to those skilled in the art, such as gas chromatography, atomic absorption, etc. If necessary, adjustments in a composition can be made based on the analytical results. Treatment of the affected water bearing formation by the present invention can be continued until sampling and analysis shows that the chemical contamination in the area of contamination within the affected water bearing formation has decreased to an acceptable level. The groundwater containing the dissolved complex formed between the bound chemical contamination and the composition of the present invention may be removed from the treated water bearing formation by conventional methods such as pumping wells or other groundwater withdrawal, filtering or purification systems. Treatment can be followed by the application of potable water to wash excess or residual components of the composition from the remediated subsurface water bearing geological formation. This washing step of the process can be continued until sampling and analysis show that excess composition has been removed to an acceptable level.

The application of a composition of the present invention into an affected subsurface water bearing geological formation may form a dissolved complex simultaneously with the free chemical contamination in the body of groundwater contained within the affected subsurface water bearing geological formation not bound to the surface area within the primary and secondary porosities of the affected water bearing formation as the chemical contamination is carried by groundwater. The groundwater containing the dissolved complex formed between the free chemical contamination and a composition of the present invention may be removed from the affected water bearing formation simultaneously with groundwater containing the dissolved complex of bound chemical contamination eluted from the affected water bearing formation described above.

The removed groundwater containing the dissolved complex formed between the bound or free chemical contamination and the composition of the present invention may be appropriately disposed of or treated by conventional filtration or purification methods known to those skilled in the art, such as activated carbon treatment, reverse osmosis, ultrafiltration, aeration, oxidation processes (e.g., ozonolysis, hydrogen peroxide, etc.) or biodegradation, prior to disposal or discharge. For example, the biodegradation of the chemical contamination in the removed groundwater containing the dissolved complex formed between the chemical contamination and a composition may be induced by applying an air or oxygen source, agitation and a microbe capable of altering the molecular structure of the chemical contamination, thus, rendering the chemical contamination innocuous. The oxidized form of lignitic coal in the removed groundwater may act as the nutrient source to sustain microbial activity or another nutrient (e.g., urea) may be added.

The present invention is illustrated in the examples, but the invention is not meant to be limited to the details described therein.

EXPERIMENTAL

A chemically contaminated subsurface water bearing geological formation was simulated in the laboratory using a glass column packed with clean potting soil, saturated with water of drinking quality, and contaminated with a known chemical. Two columns were utilized in each example. One column was treated with a composition, while the second column acted as a control. The top of each column simulated a conventional injection well network, upgradient from the simulated chemically contaminated subsurface water bearing formation. The stopcock at the bottom of each column simulated either a conventional monitoring well network for collecting samples or a conventional groundwater withdrawal well network for the removal of the eluant plume, downgradient from the simulated chemically contaminated subsurface water bearing formations.

Two glass columns were packed loosely with potting soil to facilitate water flow. The tops of the columns were charged with drinking water which was allowed to flow through the columns and saturate the soil beds. An excess amount of drinking water was passed through the saturated soil beds of the columns to develop the porosity until the discharge through the stopcocks became colorless and clear of soil fines. The saturated soil beds in the columns were maintained throughout the experiment.

The water levels in the columns were allowed to become flush with the surface of the saturated soil beds of the columns, then aliquots of known chemical contamination were loaded onto the surface of the saturated soil beds and allowed to seep into the saturated soil beds to simulate the release and seepage of chemical contamination into subsurface water bearing geological formations. Then the tops of the columns were charged with drinking water and the flow of water through the columns was maintained to physically draw the aliquots of chemical contamination downgradient through the saturated soil beds and develop simulated chemical contaminant plumes within subsurface water bearing geological formations. The stopcocks, which controlled the flow of water through the columns, were adjusted equally to simulate the rate of groundwater flow throughout the experiment. The discharges from the stopcocks were collected in fractions for analysis. The stopcocks simulated monitoring well networks. The fractions simulated groundwater samples.

The fractions were analyzed by appropriate methods (e.g., gas chromatography, atomic absorption, etc.) for the presence of chemical contamination. Based on the types, electronegativities, molecular sizes and concentrations of chemical contamination discharged into the saturated soil bed, a composition comprised of leonardite and at least one surface active agent was prepared in accordance with Table 1. The dilution effect and chemistry of the water in the columns as well as the hydraulic conductivity of the soil beds in the columns were not considered in preparing the compositions in the examples of this application because the drinking water, potting soil and water volume within the soil beds had a negligible effect on the performance of the compositions.

The water levels in the columns were allowed to become flush with the surface of the chemically contaminated saturated soil beds, then the top of one column was charged with a composition, while the other column acted as a control. The composition was allowed to flow through the chemically contaminated saturated soil bed of the column and elute the chemical contamination, forming an eluant plume. The eluant plume was removed and collected in fractions through the stopcock. In this instance, the stopcock simulated a conventional groundwater withdrawal well network. The fractions were analyzed for the presence of the chemical contamination. Treatment was continued until analysis of the fractions showed that the chemical contamination was decreased to an acceptable level. Then the top of the column was charged with excess drinking water and allowed to flow through the treated saturate soil bed to wash excess components of the composition. A sample of the discharge from the stopcock was collected and analyzed to confirm the composition was removed to an acceptable level.

The composition was not loaded onto the second column. Instead, drinking water in an amount equal to the composition used in the first column was loaded onto the second column to compare the effectiveness of the present invention against the conventional remediation method of groundwater extraction. The drinking water was allowed to flow through the chemically contaminated saturated soil bed of the second column and extract the chemical contamination over an equal period of time. The drinking water extract was collected in fractions from the stopcock and analyzed for the presence of the chemical contaminants.

The present invention decreased the chemical contaminants from the simulated subsurface water bearing geological formation to an acceptable level in each example, whereas the conventional remediation method of groundwater extraction had a negligible impact on the concentration of chemical contamination in a subsurface water bearing geological formation.

EXAMPLE 1

Two glass columns, 36 centimeters ("cm") in length and 2 cm in diameter (herein defined as "Column A" and "Column B"), were packed loosely with about 16.4 and about 15.6 gm of clean pofting soil, respectively. The soil beds of each column were saturated with water of drinking quality and the columns charged with excess drinking water. The stopcocks of each column were opened wide to allow the water to pass through the soil beds of columns A and B until the discharge water became clear and colorless, wherein each stopcock was adjusted to a drip rate of about 30 drops per minute and maintained throughout the experiment. When the water level in each column became flush with the surface of the soil beds, about 0.01 gm of trichloroethane, a volatile organic compound, was applied onto the surfaces of each soil bed. The trichloroethane was allowed to seep into the surface of each soil bed, wherein each column was charged with about 40 ml of water of drinking quality. The water was allowed to pass through the soil beds of columns A and B, wherein four (4) 10 ml fractions were collected from each column. The fractions from columns A and B were pooled separately and analyzed by gas chromatography ("GC") for the presence of trichloroethane leaching from each soil bed. No trichloroethane was detected in the pooled fractions from columns A or B.

About 100 ml of an aqueous composition comprised of leonardite at about 10% (by weight of the total composition), Triton 150®, a nonionic surfactant available from Rohm & Haas, Pennsylvania, at about 5% (by weight of the total composition) and water at about 85% (by weight of the total composition) was prepared. When the water level in column A became flush with the surface of its soil bed, the column was charged with about 40 ml of the composition. The composition was not applied to column B. Column B was charged with about 40 ml of water of drinking quality. The composition was allowed to pass through the soil bed in column A and elute the chemical contaminant. The resulting eluant plume in column A was collected in four (4) 10 ml fractions, wherein fractions 1 through 3 were pooled. The pooled fractions and fraction 4 were analyzed for the presence of trichloroethane. Likewise, four (4) 10 ml fractions were collected from column B, pooled and analyzed for the presence of trichloroethane. Trichloroethane was detected in the pooled fractions from column A but not in fraction 4 from column A. Trichloroethane was not detected in the pooled fractions from column B.

When the water level of column A became flush with the soil bed, the column was recharged with about 50 ml of water of drinking quality to wash excess components of the composition, wherein a sample was collected from column A and analyzed by GC to confirm the composition was removed to an acceptable level.

EXAMPLE 2

Two glass columns, 36 cm in length and 2 cm in diameter (herein defined as "Column A" and "Column B"), were packed loosely with about 15.6 gm of clean potting soil. The soil beds of each column were saturated with water of drinking quality and the columns charged with excess drinking water. The stopcocks of each column were opened wide to allow the water to pass through the soil beds of columns A and B until the discharge water became clear and colorless, wherein each stopcock was adjusted to a drip rate of about 30 drops per minute and maintained throughout the experiment. When the water level in each column became flush with the surface of the soil beds, about 0.01 gm of phenol, an acid extractable compound, was applied onto the surfaces of each soil bed. The phenol was allowed to seep into the surface of each soil bed, wherein each column was charged with about 40 ml of water of drinking quality. The water was allowed to pass through the soil beds of columns A and B, wherein four (4) 10 ml fractions were collected from each column. The fractions from columns A and B were pooled separately and analyzed by GC for the presence of phenol leaching from each soil bed. No phenol was detected in the pooled fractions from columns A or B.

About 100 ml of an aqueous composition comprised of leonardite at about 10% (by weight of the total composition), sodium lauryl sulfate, an anionic surfactant, at about 5% (by weight of the total composition) and water at about 85% (by weight of the total composition) was prepared. When the water level in column A became flush with the surface of its soil bed, the column was charged with about 40 ml of the composition. The composition was not applied to column B. Column B was charged with about 40 ml of water of drinking quality. The composition was allowed to pass through the soil bed in column A and elute the chemical contaminant. The resulting eluant plume in column A was collected in four (4) 10 ml fractions, wherein fractions 1 through 3 were pooled. The pooled fractions and fraction 4 were analyzed for the presence of phenol. Likewise, four (4) 10 ml fractions were collected from column B, pooled and analyzed for the presence of phenol. Phenol was detected in the pooled fractions from column A but not in fraction 4 from column A. Phenol was not detected in the pooled fractions from column B.

When the water level of column A became flush with the soil bed, the column was recharged with about 50 ml of water of drinking quality to wash excess components of the composition, wherein a sample was collected from column A and analyzed by GC to confirm the composition was removed to an acceptable level.

EXAMPLE 3

Two glass columns, 36 cm in length and 2 cm in diameter (herein defined as "Column A" and "Column B"), were packed loosely with about 16.4 and about 16.0 gm of clean potting soil, respectively. The soil beds of each column were saturated with water of drinking quality and the columns charged with excess drinking water. The stopcocks of each column were opened wide to allow the water to pass through the soil beds of columns A and B until the discharge water became clear and colorless, wherein each stopcock was adjusted to a drip rate of about 30 drops per minute and maintained throughout the experiment. When the water level in each column became flush with the surface of the soil beds, about 0.01 gm of naphthalene, a base neutral compound, was powdered and applied onto the surfaces of each soil bed, wherein each column was charged with about 40 ml of water of drinking quality. The water was allowed to pass through the soil beds of columns A and B, wherein four (4) 10 ml fractions were collected from each column. The fractions from columns A and B were pooled separately and analyzed by GC for the presence of naphthalene leaching from each soil bed. No naphthalene was detected in the pooled fractions from columns A or B.

About 100 ml of an aqueous composition comprised of leonardite at about 10% (by weight of the total composition), distearyldimethylammoniumchloride, a cationic surfactant, at about 5% (by weight of the total composition) and water at about 85% (by weight of the total composition) was prepared. When the water level in column A became flush with the surface of its soil bed, the column was charged with about 40 ml of the composition. The composition was not applied to column B. Column B was charged with about 40 ml of water of drinking quality. The composition was allowed to pass through the soil bed in column A and elute the chemical contaminant. The resulting eluant plume in column A was collected in four (4) 10 ml fractions, wherein fractions 1 through 3 were pooled. The pooled fractions were analyzed for the presence of naphthalene. Likewise, four (4) 10 ml fractions were collected from column B, pooled and analyzed for the presence of naphthalene. Naphthalene was detected in the pooled fractions from column A but not in fraction 4 from column A. Naphthalene was not detected in the pooled fractions from column B.

When the water level of column A became flush with the soil bed, the column was recharged with about 50 ml of water of drinking quality to wash excess components of the composition, wherein a sample was collected from column A and analyzed by GC to confirm the composition was removed to an acceptable level.

EXAMPLE 4

Two glass columns, 36 cm in length and 2 cm in diameter (herein defined as "Column A" and "Column B"), were packed loosely with about 16.8 and about 16.0 gm of clean potting soil, respectively. The soil beds of each column were saturated with water of drinking quality and the columns charged with excess drinking water. The stopcocks of each column were opened wide to allow the water to pass through the soil beds of columns A and B until the discharge water became clear and colorless, wherein each stopcock was adjusted to a drip rate of about 30 drops per minute and maintained throughout the experiment. When the water level in each column became flush with the surface of the soil beds, about 0.01 gm of pyrethrin, an insecticide, was applied onto the surfaces of each soil bed. The pyrethrin was allowed to seep into the surface of each soil bed, wherein each column was charged with about 40 ml of water of drinking quality. The water was allowed to pass through the soil beds of columns A and B, wherein four (4) 10 ml fractions were collected from each column. The fractions from columns A and B were pooled separately and analyzed by GC for the presence of pyrethrin leaching from each soil bed. No pyrethrin was detected in the pooled fractions from columns A or B.

About 100 ml of an aqueous composition comprised of leonardite at about 10% (by weight of the total composition), Triton 150®, a nonionic surfactant, at about 5% (by weight of the total composition) and water at about 85% (by weight of the total composition) was prepared. When the water level in column A became flush with the surface of its soil bed, the column was charged with about 40 ml of the composition. The composition was not applied to column B. Column B was charged with about 40 ml of water of drinking quality. The composition was allowed to pass through the soil bed in column A and elute the chemical contaminant. The resulting eluant plume in column A was collected in four (4) 10 ml fractions, wherein fractions 1 through 3 were pooled. The pooled fractions were analyzed for the presence of pyrethrin. Likewise, four (4) 10 ml fractions were collected from column B, pooled and analyzed for the presence of pyrethrin. Pyrethrin was detected in the pooled fractions from column A but not in fraction 4 from column A. Pyrethrin was not detected in the pooled fractions from column B.

When the water level of column A became flush with the soil bed, the column was recharged with about 50 ml of water of drinking quality to wash excess components of the composition, wherein a sample was collected from column A and analyzed by GC to confirm the composition was removed to an acceptable level.

EXAMPLE 5

Two glass columns, 36 cm in length and 2 cm in diameter (herein defined as "Column A" and "Column B"), were packed loosely with about 16.0 and about 15.6 gm of clean potting soil, respectively. The soil beds of each column were saturated with water of drinking quality and the columns charged with excess drinking water. The stopcocks of each column were opened wide to allow the water to pass through the soil beds of columns A and B until the discharge water became clear and colorless, wherein each stopcock was adjusted to a drip rate of about 30 drops per minute and maintained throughout the experiment. When the water level in each column became flush with the surface of the soil beds, about 0.01 gm of silver chloride, a metal salt, was powdered and applied onto the surfaces of each soil bed, wherein each column was charged with about 40 ml of water of drinking quality. The water was allowed to pass through the soil beds of columns A and B and collected in four (4) 10 ml fractions. Fractions 1 through 4 from columns A and B were analyzed for the presence of silver by adding 2 drops of a 5% by weight diphenylthiocarbazone solution, wherein the appearance of a red color indicated the presence of silver. No color change was observed in any fraction—confirming that silver was not leaching from the soil beds.

About 100 ml of a composition comprised of leonardite at about 10% (by weight of the total composition), Triton 150®, a nonionic surfactant, at about 5% (by weight of the total composition) and water at about 85% (by weight of the total composition) was prepared. When the water level in column A became flush with the surface of the soil bed, the column was charged with about 40 ml of the composition. The composition was not applied to column B. Column B was charged with about 40 ml of water of drinking quality. The composition was allowed to pass through the soil bed in column A and elute the chemical contaminant. The resulting eluant plume in column A was collected in four (4) 10 ml fractions, wherein each fraction was analyzed for the presence of silver by a 5% by weight diphenylthiocarbazone solution. Likewise, four (4) 10 ml fractions were collected from column B and analyzed for the presence of silver. Silver was detected in fractions 1 through 3 from column A but not in fraction 4 from column A. Silver was not detected in fractions 1 through 4 from column B.

When the water level of column A became flush with the soil bed, the column was recharged with about 50 ml of water of drinking quality to wash excess components of the composition, wherein a sample was collected from column A and analyzed by GC to confirm the composition was removed to an acceptable level.

What is claimed is:

1. A composition for decreasing chemical contamination in subsurface water bearing geological formations, comprising: the soluble eluting materials of an oxidized form of lignitic coal; and at least one surface active agent in concentrations sufficient to complex with a chemical contaminant in a subsurface water bearing geological formation, and water, wherein the insoluble inert substances of the oxidized form of lignitic coal are excluded from said composition.

2. The composition of claim 1, wherein the surface active agent is a cationic surfactant.

3. The composition of claim 1, wherein the surface active agent is an anionic surfactant.

4. The composition of claim 1, wherein the surface active agent is an amphoteric surfactant.

5. The composition of claim 1, wherein the surface active agent is a nonionic surfactant.

6. A composition for decreasing chemical contamination in subsurface water bearing geological formations, comprising: the soluble eluting materials of an oxidized form of lignitic coal; and at least one cationic surface active agent in concentrations sufficient to complex with a chemical contaminant in a subsurface water bearing geological formation, and water, wherein the insoluble inert substances of the oxidized form of lignitic coal are excluded from said composition.

7. A composition for decreasing chemical contamination in subsurface water bearing geological formations, comprising: the soluble eluting materials of an oxidized form of lignitic coal; and at least one anionic surface active agent in concentrations sufficient to complex with a chemical contaminant in a subsurface water bearing geological formation, and water, wherein the insoluble inert substances of the oxidize form of lignitic coal are excluded from said composition.

8. A composition for decreasing chemical contamination in subsurface water bearing geological formations, comprising: the soluble eluting materials of an oxidized form of lignitic coal; and at least one amphoteric surface active agent in concentrations sufficient to complex with a chemical contaminant in a subsurface water bearing geological formation, and water, wherein the insoluble inert substances of the oxidized form of lignitic coal are excluded from said composition.

9. A composition for decreasing chemical contamination in subsurface water bearing geological formations, comprising: the soluble eluling materials of an oxidized form of lignitic coal; and at least one nonionic surface active agent in concentrations sufficient to complex with a chemical contaminant in a subsurface water bearing geological formation, and water, wherein the insoluble inert substances of the oxidized form of lignitic coal are excluded from said composition.

10. A composition for decreasing chemical contamination in subsurface water bearing geological formations, comprising: an oxidized form of lignitic coal; and at least one cationic surface active agent; and at least one amphotcric surface active agent in concentrations sufficient to complex with a chemical contaminant in a subsurface water bearing geological formation, and water.

11. A composition for decreasing chemical contamination in subsurface water bearing geological formations, comprising: the soluble eluting materials of an oxidized form of lignitic coal; and at least one cationic surface active agent; and at least one nonionic surface active agent in concentrations sufficient to complex with a chemical contaminant in a subsurface water bearing geological formation, and water, wherein the insoluble inert substances of the oxidized form of lignitic coal are excluded from said composition.

12. A composition for decreasing chemical contamination in subsurface water bearing geological formations, comprising: an oxidized form of lignitic coal; and at least one cationic surface active agent; and at least one amphoteric surface active agent; and at least one nonionic surface active agent in concentrations sufficient to complex with a chemical contaminant in a subsurface water bearing geological formation, and water.

13. A composition for decreasing chemical contamination in subsurface water bearing geological formations, comprising: an oxidized form of lignitic coal; and at least one anionic surface active agent; and at least one amphoteric surface active agent in concentrations sufficient to complex with a chemical contaminant in a subsurface water bearing geological formation, and water.

14. A composition for decreasing chemical contamination in subsurface water bearing geological formations, comprising: an oxidized form of lignitic coal; and at least one anionic surface active agent; and at least one nonionic surface active agent in concentrations sufficient to complex with a chemical contaminant in a subsurface water bearing geological fornation, and water.

15. A composition for decreasing chemical contamination in subsurface water bearing geological formations, comprising: an oxidized form of lignitic coal; and at least one anionic surface active agent; and at least one amphoteric surface active agent; and at least one nonionic surface active agent in concentrations sufficient to complex with a chemical contaminant in a subsurface water bearing geological formation, and water.

16. A composition for decreasing chemical contamination in subsurface water bearing geological formations, comprising: an oxidized form of lignitic coal; and at least one amphoteric surface active agent; and at least one nonionic surface active agent in concentrations sufficient to complex with a chemical contaminant in a subsurface water bearing geological formation, and water.

17. A composition for decreasing chemical contamination in subsurface water bearing geological formations, comprising; the soluble eluting materials of an oxidized form of lignitic coal in a concentration sufficient to complex with a chemical contaminant in a subsurface water bearing geological formation, and water, wherein the insoluble inert substances of the oxidized form of lignitic coal are excluded from said composition.

18. A method for preparing a composition for decreasing chemical contamination in subsurface water bearing geological formations, comprising the steps of:

(a) pretreating the oxidized form of lignitic coal having soluble eluting materials and insoluble inert substances in a caustic solution at a pH greater than 10.0 at ambient temperature to dissolve the eluting materials;

(b) removing the insoluble inert substances from the solution;

(c) adjusting the concentration of the oxidized form of lignitic coal in the solution by dilution using a hydroxylic solvent with the general formula R—OH, where $R=C_nH_{(2n+1)}$, where n=0 to 10;

(d) adjusting the pH of the solution from about pH 4 to about pH 10 using an inorganic acid, organic acid or reducing agent; and (e) adding at least one surface active agent in a concentration sufficient to complex with a chemical contaminant in a subsurface water bearing geological formation.

19. A method for preparing a composition for decreasing chemical contamination in subsurface water bearing geological formations comprising the steps of: combining the soluble eluting materials an oxidized form of lignitic coal in a concentration sufficient to complex with a chemical contaminant in a subsurface water bearing geological formation, and water, wherein the insoluble inert substances of the oxidized form of lignitic coal are excluded from said composition, wherein the concentration of the soluble eluting materials of the oxidized form of lignitic coal component ranges from about 1% to about 40% (by weight of the total composition), and the balance of the composition is water.

20. A method for preparing compositions for decreasing chemical contamination in subsurface water bearing geological formations, comprising the steps of:
   (a) pretreating the oxidized form of lignitic coal having soluble eluting materials and insoluble inert substances in a caustic solution at a pH greater than 10.0 at ambient temperature to dissolve the eluting materials;
   (b) removing the insoluble inert substances from the solution;
   (c) adjusting the concentration of the oxidized form of lignitic coal in the solution by dilution using a hydroxylic solvent with the general formula R—OH, where $R=C_nH_{(2n+1)}$, where n=0 to 10; and
   (d) adjusting the pH of the solution from about pH 4 to about pH 10 using an inorganic or organic acid or reducing agent.

21. A composition for decreasing chemical contamination in subsurface water bearing geological formations, comprising: the soluble eluting materials of an oxidized form of lignitic coal; and at least one cationic surface active agent; and at least one amphoteric surface active agent; in concentrations sufficient to complex with a chemical containment in a subsurface water bearing geological formation, and water.

22. A composition for decreasing chemical contamination in subsurface water bearing geological formations, comprising: the soluble eluting materials of an oxidized form of lignitic coal; and at least one cationic surface active agent; and at least one amphoteric surface active agent; and at least one nonionic surface active agent in concentrations sufficient to complex with a chemical contaminant in a subsurface water bearing geological formation, and water.

23. A composition for decreasing chemical contamination in subsurface water bearing geological formations, comprising: the soluble eluting materials of an oxidized form of lignitic coal; and at least one anionic surface active agent; and at least one amphoteric surface active agent in concentrations sufficient to complex with a chemical contaminant in a subsurface water bearing geological formation, and water.

24. A composition for decreasing chemical contamination in subsurface water bearing geological formations, comprising: the soluble eluting materials of an oxidized form of lignitic coal; and at least one anionic surface active agent; and at least one nonionic surface active agent in concentrations sufficient to complex with a chemical contaminant in a subsurface water bearing geological formation, and water.

25. A composition for decreasing chemical contamination in subsurface water bearing geological formations, comprising: the soluble eluting materials of an oxidized form of lignitic coal; and at least one anionic surface active agent; and at least one amphoteric surface active agent; and at least one nonionic surface active agent in concentrations sufficient to complex with a chemical contaminant in a subsurface water bearing geological formation, and water.

26. A composition for decreasing chemical contamination in subsurface water bearing geological formations, comprising; the soluble eluting materials of an oxidized form of lignitic coal; and at least one amphoteric surface active agent; and at least one nonionic surface active agent in concentrations sufficient to complex with a chemical contaminant in a subsurface water bearing geological formation, and water.

27. A composition for decreasing chemical contamination in subsurface water bearing geological formations, comprising: the soluble eluting materials of an oxidized form of lignitic coal; arid at least one cationic surface active agent; and at least one amphoteric surface active agent in concentrations sufficient to complex with a chemical contaminant in a subsurface water bearing geological formation, and water, wherein the insoluble inert substances of the oxidized form of lignitic coal are excluded from said composition.

28. A composition for decreasing chemical contamination in subsurface water bearing geological formations, comprising: the soluble eluting materials of an oxidized form of lignitic coal; and at least one cationic surface active agent; and at least one amphoteric surface active agent; and at least one nonionic surface active agent in concentrations sufficient to complex with a chemical contaminant in a subsurface water bearing geological formation, and water, wherein the insoluble inert substances of the oxidized form of lignitic coal are excluded from said composition.

29. A composition for decreasing chemical contamination in subsurface water bearing geological formations, comprising: the soluble eluting materials of an oxidized form of lignitic coal; and at least one anionic surface active agent; and at least one amphoteric surface active agent in concentrations sufficient to complex with a chemical contaminant in a subsurface water bearing geological formation, and water, wherein the insoluble inert substances of the oxidized form of lignitic coal are excluded from said composition.

30. A composition for decreasing chemical contamination in subsurface water bearing geological formations, comprising: the soluble eluting materials of an oxidized form of lignitic coal; and at least one anionic surface active agent; and at least one nonionic surface active agent in concentrations sufficient to complex with a chemical contaminant in a subsurface water bearing geological formation, and water, wherein the insoluble inert substances of the oxidized form of lignitic coal are excluded from said composition.

31. A composition for decreasing chemical contamination in subsurface water bearing geological formations, comprising: the soluble eluting materials of an oxidized form of lignitic coal; and at least one anionic surface active agent, and at least one amphoteric surface active agent; and at least one nonionic surface active agent in concentrations sufficient to complex with a chemical contaminant in a subsurface water bearing geological formation, and water, wherein the insoluble inert substances of the oxidized form of lignitic coal are excluded from said composition.

32. A composition for decreasing chemical contamination in subsurface water bearing geological formations, comprising: the soluble eluting materials of an oxidized form of lignitic coal; and at least one amphoteric surface active agent; and at least one nonionic surface active agent in concentrations sufficient to complex with a chemical contaminant in a subsurface water bearing geological formation, and water, wherein the insoluble inert substances of the oxidized form of lignitic coal are excluded from said composition.

33. The compositions of claims 21, 22, 23, 25, 26, 27, 28, 29, 31 or 32, wherein the amphoteric surface active agent is a phosphotidyl choline compound.

34. The composition of claim 33, wherein the phosphotidyl choline compound is lecithin.

35. The compositions of claims 2, 6, 10, 11, 12, 21, 22, 27 or 28, wherein the pH range of the composition is about pH 4 to about pH 7.

36. The compositions of claims 3, 7, 13, 14, 15, 23, 24, 25, 29, 30 or 31, wherein the pH range of the composition is about pH 7 to about pH 10.

37. The compositions of claims 1, 6, 7, 8, 9, 10, 11, 12, 13, 14, 15, 16, 21, 22, 23, 24, 25, 26, 27, 28, 29, 30, 31 or 32, wherein the concentration of the soluble eluting materials of the oxidized form of lignitic coal component ranges from about 1% to about 40% (by weight of the total composition), the concentration of the surface active agent component ranges from about 0.5% to about 20% (by weight of the total composition), and the balance of the composition is water.

38. The composition of claim 37, wherein multiple surface active agents are utilized, wherein each surface active agent is added in an amount so that the total weight percent of the surface active agent component ranges from about 0.5% to about 20% (by weight of the total composition).

39. The composition of claim 37, wherein the oxidized form of lignitic coal is leonardite.

40. The composition of claim 37, wherein the soluble eluting, materials of the oxidized form of lignitic coal in a composition is a water soluble derivative altered by chemical or biological means.

41. The composition of claim 37, wherein the pH range of the composition is about pH 4 to about pH 10.

42. The compositions of claims 1, 6, 7, 8, 9, 10, 11, 12, 13, 14, 15, 16, 21, 22, 23, 24, 25, 26, 27, 28, 29, 30, 31 or 32, wherein the concentration of the soluble eluting materials of the oxidized form of lignitic coal component ranges from about 10% to about 25% (by weight of the total composition), the concentration of surface active agent component ranges from about 5% to about 15% (by weight of the total composition), and the balance of the composition is water.

43. The composition of claim 42, wherein multiple surface active agents are utilized, wherein each surface active agent is added in an amount so that the total weight percent of the surface active agent component ranges from about 5% to about 15% (by weight of the total composition).

44. The composition of claim 42, wherein the oxidized form of lignitic coal is leonardite.

45. The composition of claim 42, wherein the soluble eluting materials of the oxidized form of lignitic coal in a composition is a water soluble derivative altered by chemical or biological means.

46. The composition of claim 42, wherein the pH range of the composition is about pH 4 to about pH10.

47. The composition of claim 17, wherein the concentration of the soluble eluting materials of the oxidized form of lignitic coal component ranges from about 1% to about 40% (by weight of the total composition), and the balance of the composition is water.

48. The composition of claim 17, wherein the concentration of the soluble eluting materials of the oxidized form of lignitic coal component ranges from about 10% to about 25% (by weight of the total composition), and the balance of the composition is water.

49. The compositions of claims 47 or 48, wherein the oxidized form of lignitic coal is leonardite.

50. The compositions of claims 47 or 48, wherein the soluble eluting materials of the oxidized form of lignitic coal in a composition is a water soluble derivative altered by chemical or biological means.

51. The compositions of claims 1, 4, 5, 8, 9, 16, 17, 26, or 32, wherein the pH range of the composition is about pH 4 to about pH 10.

52. A method for preparing a composition for decreasing chemical contamination in subsurface water bearing geological formations comprising the steps of: combining the soluble eluting materials of an oxidized form of lignitic coal, and at least one surface active agent in concentrations sufficient to complex with a chemical contaminant in a subsurface water bearing geological formation, and water, wherein the insoluble inert substances of the oxidized form of lignitic coal are excluded from said composition, wherein the concentration of the soluble eluting materials of the oxidized form of lignitic coal component ranges from about 1% to about 40% (by weight of the total composition), the concentration of surface active agent component ranges from about 0.5% to about 20% (by weight of the total composition), and the balance of the composition is water.

53. The method of claim 52, wherein multiple surface active agents are utilized, wherein each surface active agent is added in an amount so that the total weight percent of the surface active agent component ranges from about 0.5% to about 20% (by weight of the total composition).

54. The method of claim 52, wherein the concentration of the soluble eluting materials of the oxidized form of lignitic coal component ranges from about 10% to about 25% (by weight of the total composition), the concentration of surface active agent component ranges from about 5% to about 15% (by weight of the total composition), and the balance of the composition is water.

55. The method of claim 54, wherein multiple surface active agents are utilized, wherein each surface active agent is added in an amount so that the total weight percent of the surface active agent component ranges from about 5% to about 15% (by weight of the total composition).

56. The method of claim 19, wherein the concentration of the soluble eluting materials of the oxidized form of lignitic coal component ranges from about 10% to about 25% (by weight of the total composition), and the balance of the composition is water.

57. The methods of claims 18 or 20, wherein the pretreatment step is carried out for about 24 to about 48 hours.

58. The methods of claims 18 or 20, wherein n=0 to 2.

59. The methods of claims 18 or 20, wherein n=0.

60. The methods of claims 18 or 20, wherein the reducing agent is a monovalent sulfite compound or bivalent sulfite compound.

61. The method of claim 60, wherein the bivalent sulfite compound is magnesium sulfite or calcium sulfite.

62. The method of claim 60, wherein the monovalent sulfite compound is sodium bisulfite or potassium bisulfite.

63. The methods of claims 18 or 20, further comprising the step of adjusting the viscosity of the solution using a hydroxylic solvent with the general formula R—OH, where R=$C_nH_{(2n+1)}$, where n=0 to 10, prior to removal of the insoluble inert substances.

64. The method of claim 63, wherein n=0 to 2.

65. The method of claim 63, wherein n=0.

66. The methods of claims 52, 54, 18, 19, 56 or 20, wherein the oxidized form of lignitic coal in a composition is leonardite.

67. The methods of claims 52, 54, 18, 19, 56 or 20, wherein the oxidized form of lignitic coal in a composition is a water soluble derivative altered by chemical or biological means.

68. The methods of claims 52, 54, 19, or 56 wherein said method is carried out at a pH range of about pH 4 to about pH 10.

69. The method of claim 18, further comprising the step (f) of adding a hydroxylic solvent with the general formula R—OH, where $R=C_nH_{(2n+1)}$ and where n=1 to 10, in an amount sufficient to solubilize the surface active agent utilized.

70. The method of claim 69, wherein n=1 to 2.

71. The method of claim 69, wherein n=2.

72. The compositions of claims 9, 11, 12, 14, 15, 16, 22, 24, 25, 26, 28, 30 31 or 32, wherein the nonionic surface active agent is selected from a group of naturally occurring surfactants consisting of: xanthan gum, bluran, dextran, agar, galaginan, phaseleran, alginates, locust bean gum, guar gum, fatsia gum, gum arabica, karaya gum, tragacanth, pectin, processed starch, gelatin and casein.

73. The methods of claims 52, 54, 18, 19 or 56, wherein the soluble eluting materials of the oxidized form of lignitic coal in a composition is a water soluble derivative altered by chemical or biological means.

74. The composition of claims 1, 6, 7, 8, 9, 10, 11, 12, 13, 14, 15, 16, 17, 47, 48, 52, 54, 19, 56, 21, 22, 23, 24, 25, 26, 27, 28, 29, 30 31 or 32, further comprising at least one hydroxylic solvent having the general formula R—OH, where $R=C_nH_{(2n+1)}$, where n=1 to 10 in an amount sufficient to solubilize the surface active agent utilized.

75. The composition of claim 74, wherein n=1 to 2.

76. The composition of claim 74, wherein n=2.

77. The composition of claim 37, further comprising at least one hydroxylic solvent having the general formula R—OH, where $R=C_nH_{(2n+1)}$, where n=1 to 10 in an amount sufficient to solubilize the surface active agent utilized.

78. The composition of claim 77, wherein n=1 to 2.

79. The composition of claim 77, wherein n=2.

80. The composition of claim 42, further comprising at least one hydroxylic solvent having the general formula R—OH, where $R=C_nH_{(2n+1)}$, where n=1 to 10 in an amount sufficient to solubilize the surface active agent utilized.

81. The composition of claim 80, wherein n=1 to 2.

82. The composition of claim 80, wherein n=2.

83. The compositions of claims 1, 6, 7, 8, 10, 11, 12, 13, 14, 15, 16, 17, 22, 23, 24, 25, 26, 27, 28, 29, 30, 31 or 32, wherein the oxidized form of lignitic coal is leonardite.

84. The compositions of claims 1, 6, 7, 8, 9, 10, 11, 12, 13, 14, 15, 16, 17, 21, 22, 23, 24, 25, 26, 27, 28, 29, 30, 31 or 32, wherein the soluble eluting materials of the oxidized form of lignitic coal in a composition is a water soluble derivative altered by chemical or biological means.

* * * * *